(12) United States Patent
Baldwin et al.

(10) Patent No.: US 9,009,434 B2
(45) Date of Patent: *Apr. 14, 2015

(54) METHODS AND SYSTEMS FOR DATA CLEANUP USING PHYSICAL IMAGE OF FILES ON STORAGE DEVICES

(75) Inventors: Duane Mark Baldwin, Rochester, MN (US); Sandeep Ramesh Patil, Pune (IN); Riyazahamad Moulasab Shiraguppi, Pune (IN); Prashant Sodhiya, Pune (IN)

(73) Assignee: International Business Machines Corporation, Armonk, NY (US)

( * ) Notice: Subject to any disclaimer, the term of this patent is extended or adjusted under 35 U.S.C. 154(b) by 173 days.

This patent is subject to a terminal disclaimer.

(21) Appl. No.: 13/584,417

(22) Filed: Aug. 13, 2012

(65) Prior Publication Data

US 2014/0047207 A1    Feb. 13, 2014

(51) Int. Cl.
| | | |
|---|---|---|
| G06F 12/02 | (2006.01) | |
| G06F 3/06 | (2006.01) | |
| G06F 17/30 | (2006.01) | |

(52) U.S. Cl.
CPC .......... *G06F 3/0652* (2013.01); *G06F 3/0608* (2013.01); *G06F 3/0611* (2013.01); *G06F 3/0644* (2013.01); *G06F 3/0671* (2013.01); *G06F 3/068* (2013.01); *G06F 17/30* (2013.01)

(58) Field of Classification Search
None
See application file for complete search history.

(56) References Cited

U.S. PATENT DOCUMENTS

| | | | | |
|---|---|---|---|---|
| 5,628,004 | A * | 5/1997 | Gormley et al. | 707/104 |
| 6,070,174 | A | 5/2000 | Starek et al. | |
| 6,507,911 | B1 | 1/2003 | Langford | |
| 6,615,365 | B1 * | 9/2003 | Jenevein et al. | 711/161 |
| 7,400,768 | B1 * | 7/2008 | Mayzlin | 382/177 |
| 7,506,002 | B2 | 3/2009 | Herbst et al. | |
| 7,650,473 | B1 | 1/2010 | Tormasov et al. | |
| 7,809,691 | B1 * | 10/2010 | Karmarkar et al. | 707/674 |
| 7,912,817 | B2 | 3/2011 | Love et al. | |
| 7,921,086 | B1 | 4/2011 | Bromley et al. | |
| 8,024,572 | B2 | 9/2011 | Vandermolen | |
| 8,140,821 | B1 * | 3/2012 | Raizen et al. | 711/202 |
| 8,234,468 | B1 * | 7/2012 | Deshmukh et al. | 711/162 |
| 8,301,874 | B1 * | 10/2012 | Heidingsfeld et al. | 718/100 |
| 2003/0191911 | A1 * | 10/2003 | Kleinschnitz, Jr. et al. | 711/154 |
| 2008/0016132 | A1 | 1/2008 | Merhar | |
| 2009/0254594 | A1 * | 10/2009 | Burchall | 707/205 |
| 2010/0281081 | A1 | 11/2010 | Stager et al. | |
| 2011/0093672 | A1 * | 4/2011 | Gokhale et al. | 711/159 |
| 2011/0218967 | A1 * | 9/2011 | Sliger et al. | 707/647 |
| 2011/0252181 | A1 * | 10/2011 | Ouye et al. | 711/101 |
| 2013/0159646 | A1 * | 6/2013 | Atzmon et al. | 711/162 |
| 2014/0046912 | A1 | 2/2014 | Baldwin et al. | |
| 2014/0059019 | A1 | 2/2014 | Baldwin et al. | |

* cited by examiner

*Primary Examiner* — Daniel J Bernard
(74) *Attorney, Agent, or Firm* — Griffiths & Seaton PLLC

(57) ABSTRACT

Systems and computer program products are provided for optimizing selection of files for eviction from a first storage pool to free up a predetermined amount of space in the first storage pool. A method includes analyzing an effective space occupied by each file of a plurality of files in the first storage pool, identifying, from the plurality of files, one or more data blocks making up a file to free up the predetermined amount of space based on the analysis of the effective space of each file of the plurality of files, selecting one or more of the plurality of files as one or more candidate files for eviction, based on the identified one or more data blocks, and evicting the one or more candidate files for eviction from the first storage pool to a second storage pool.

13 Claims, 7 Drawing Sheets

METHODS AND SYSTEMS FOR DATA CLEANUP USING PHYSICAL IMAGE OF FILES ON STORAGE DEVICES

CROSS-REFERENCE TO RELATED APPLICATIONS

This application is related to U.S. patent application Ser. No. 13/584,427, filed on Aug. 13, 2012.

BACKGROUND OF THE INVENTION

1. Field of the Invention

The present invention relates in general to data storage and, more particularly, to optimizing space in data storage.

2. Description of the Related Art

Computing storage environments increasingly store data in one or more storage environments, which in many cases are remote from a local interface presented to a user. These computing storage environments may use many storage devices such as, for example, disk drives, often working in concert, to store, retrieve, and update a large body of data. The data is provided to a host computer requesting or sending the data. In some cases, a number of data storage subsystems are collectively managed as a single data storage system. These subsystems may be managed by host system complex configurations that combine several processing units or clusters of processing units. In this way, multi-tiered/multi-system computing environments, often including a variety of types of storage devices, may be used to organize and process large quantities of data.

SUMMARY OF THE INVENTION

Current tiered-storage architectures, as described above, include a variety of storage mediums. These may include such media as enterprise hard disk drives (HDD), serial advanced technology attachment (SATA) disk drives, solid state drives (SSD), tape drives, and other devices. In most configurations, the media are separated into different tiers according to performance capabilities. For example, a first tier of storage devices includes storage devices having higher performance capabilities than a second tier of storage devices. As more and more data is stored in the storage devices, data is migrated from the first tier to the second tier, or vice versa.

Although placement of certain kinds of data in a given tier may greatly enhance overall performance of the storage environment, this may not be the case in many instances. In particular, typically when determining which data to migrate from one device to another, a cleanup tool application outputs a list of files to delete based on data importance and on policy. The administrator then arbitrarily selects files from the list to evict from a tier in order to free up a desired amount of space. However, in some cases, a first file may share deduplication data with a second file, and hence, choosing the first file for eviction frees up less space than desired. In other cases, a first file may be located on lower performance storage than a second file. Thus, choosing the first file may decrease performance of the storage environment. Additionally, a first file may not be stored as a contiguous block of data when compared to a second file, and hence, selection of the first file may also decrease performance of the storage environment.

To improve storage environment performance, methods, systems, and computer program products are provided for optimizing selection of files for eviction from a first storage pool to free up a predetermined amount of space in the first storage pool.

In an embodiment, by way of example only, a method includes analyzing an effective space occupied by each file of a plurality of files in the first storage pool, identifying, from the plurality of files, one or more data blocks making up a file to free up the predetermined amount of space based on the analysis of the effective space of each file of the plurality of files, selecting one or more of the plurality of files as one or more candidate files for eviction, based on the identified one or more data blocks, and evicting the one or more candidate files for eviction from the first storage pool to a second storage pool.

In another embodiment, by way of example only, a system for optimizing selection of files for eviction to free up a predetermined amount of space includes a first storage pool including a first storage device, a second storage pool including a second storage device, and a processor in operable communication with the first and second storage pools capable of analyzing an effective space occupied by each file of a plurality of files in the first storage pool, identifying, from the plurality of files, one or more data blocks of a file to free up the predetermined amount of space based on the analysis of the effective space of each file of the plurality of files, selecting one or more of the plurality of files as one or more candidate files for eviction, based on the identified one or more data blocks, and evicting the one or more candidate files for eviction from the first storage pool to a second storage pool.

In another embodiment, by way of example only, a physical computer storage medium comprises a computer program product for implementing a method of optimizing selection of files for eviction from a first storage pool to free up a predetermined amount of space in the first storage pool. The method includes analyzing an effective space occupied by each file of a plurality of files in the first storage pool, identifying, from the plurality of files, one or more data blocks making up a file to free up the predetermined amount of space based on the analysis of the effective space of each file of the plurality of files, selecting one or more of the plurality of files as one or more candidate files for eviction, based on the identified one or more data blocks, and evicting the one or more candidate files for eviction from the first storage pool to a second storage pool.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide an improved method for optimizing selection of files for eviction from a first storage pool to free up a predetermined amount of space in the first storage pool. The method includes analyzing an effective space occupied by each file of a plurality of files in the first storage pool, identifying, from the plurality of files, one or more data blocks making up a file to free up the predetermined amount of space based on the analysis of the effective space of each file of the plurality of files, selecting one or more of the plurality of files as one or more candidate files for eviction, based on the identified one or more data blocks, and evicting the one or more candidate files for eviction from the first storage pool to a second storage pool. Systems and physical computer program products are also provided.

Figure 1:
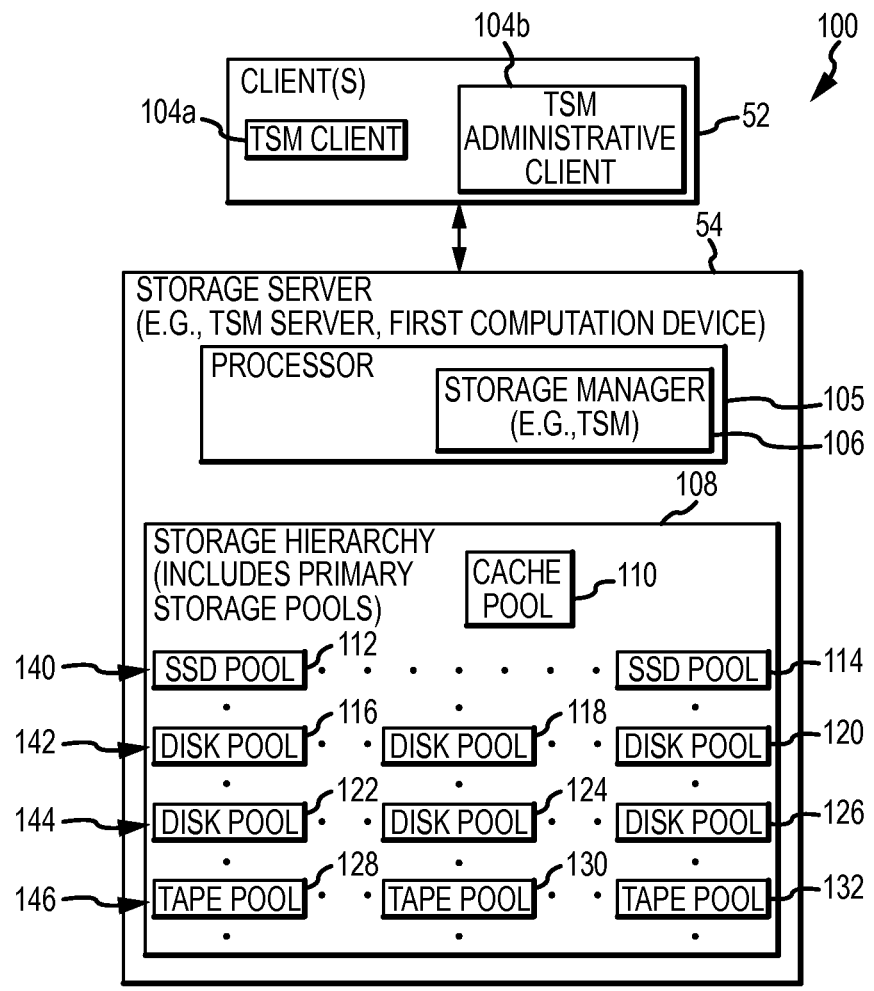
FIG. 1 is a block diagram of a computing storage environment, according to an embodiment.

FIG. 1 is a block diagram of a computing storage environment 100 in accordance with certain embodiments is illustrated. The computing storage environment 100 includes a first computational device, such as storage server 54, coupled to one or more computational devices, such as clients 52. In certain embodiments, the storage server 54 and clients 52 may comprise any suitable computational device, including those presently known in the art, such as, a personal computer, a workstation, a mainframe, a midrange computer, a network appliance, a palm top computer, a telephony device, a blade computer, a hand held computer, etc.

In an embodiment, storage server 54 is a TSM server and includes a storage manager 106, such as IBM® Tivoli® Storage Manager® (TSM), for securely storing and managing data. Storage manager 106 executes in a storage management server, such as storage server 52 or elsewhere. In one embodiment, storage manager 106 is operable by and/or in conjunction with processor device 105 as shown. One of ordinary skill in the art will appreciate that various other configurations of processor 105, storage manager 106, and related additional processing and/or memory components are contemplated. IBM, Tivoli, and Tivoli Storage Manager are trademarks or registered trademarks of IBM Corporation. Storage manager 106 may provide data storage services to clients 52, which can include TSM clients 104a, for management of data.

Storage server 54 can also store files received from one or more TSM clients 104a. In an embodiment, storage manager 106 and/or processor device 105 allows a system administrator to configure storage pools 110-132, where each storage pool 110-132 includes a group of devices used for storing data received from the TSM client 104a. Storage pools 110-132 are used as targets for store operations from the TSM client 104a and are referenced in TSM server policies and other constructs for processing. According to an embodiment, storage pools 110-132 include a variety of storage devices or storage media and are organized into a storage hierarchy 108 according to one or more metrics, such as a performance metric including write or read speeds. Storage hierarchy 108 may be organized such that the top of the hierarchy includes a cache pool 110 having a highest amount or quality of a particular performance metric. Below the cache pool 110, a number of solid state drive (SSD) class devices may be organized into SSD pools by the same, similar, or other metrics (e.g., SSD pools 112 and 114) to make up a first tier 140 of disk pools.

A second tier 142 of disk pools (e.g., disk pools 116, 118, and 120) are organized under SSD pools 112 and 114, in an embodiment. Disk pools 116, 118, and 120 include a variety of disk devices such as pools of enterprise disk drives, SATA disk drives, disk devices configured in a particular redundant array of independent disks (RAID) configuration, and the like. Disk pools 116, 118, and 120 are selected to have the same, similar, or different metric capabilities as SSD pools 112 and 114.

A third tier 144 of disk pools (e.g., pools 122, 124, and 126) can be included below disk pools 116, 118, and 120. Pools 122, 124, and 126 include devices selected for having less dependability than devices in pools 116, 118, and 120. In another embodiment, pools 122, 124, 126 exhibit a greater amount, stronger attribute or attributes, or quality of the performance metric than pools 116, 118, and 120.

Below disk pools 122, 124, and 126, a fourth tier 146 of tape pools (e.g., tape pools 128, 130, and 132) may then be organized. Tape pools 128, 130, 132 exhibit less dependability than devices making up pools 122, 124, and 126, in an embodiment. Various considerations for the organization of such storage hierarchies 108 may be apparent to one of ordinary skill in the art. In one embodiment, the system administrator may assist in performing such configurations in the storage hierarchy 108 by inputs to the TSM administrative client 104b or another mechanism.

The illustrated embodiments provide mechanisms for identifying data stored in memory devices of a first tier pool for eviction to a lower tier pool. The improved mechanism can be embodied in a clean up tool configured to take into consideration the physical image of a file stored on a memory device in a pool before identifying the file as a candidate for eviction. For example, the tool is configured to examine, among other factors, deduplication data factors, the storage location of the file on a memory device, and the contiguity of the file. In this way, free space requirement can be specified and met with particularity.

Figure 2:
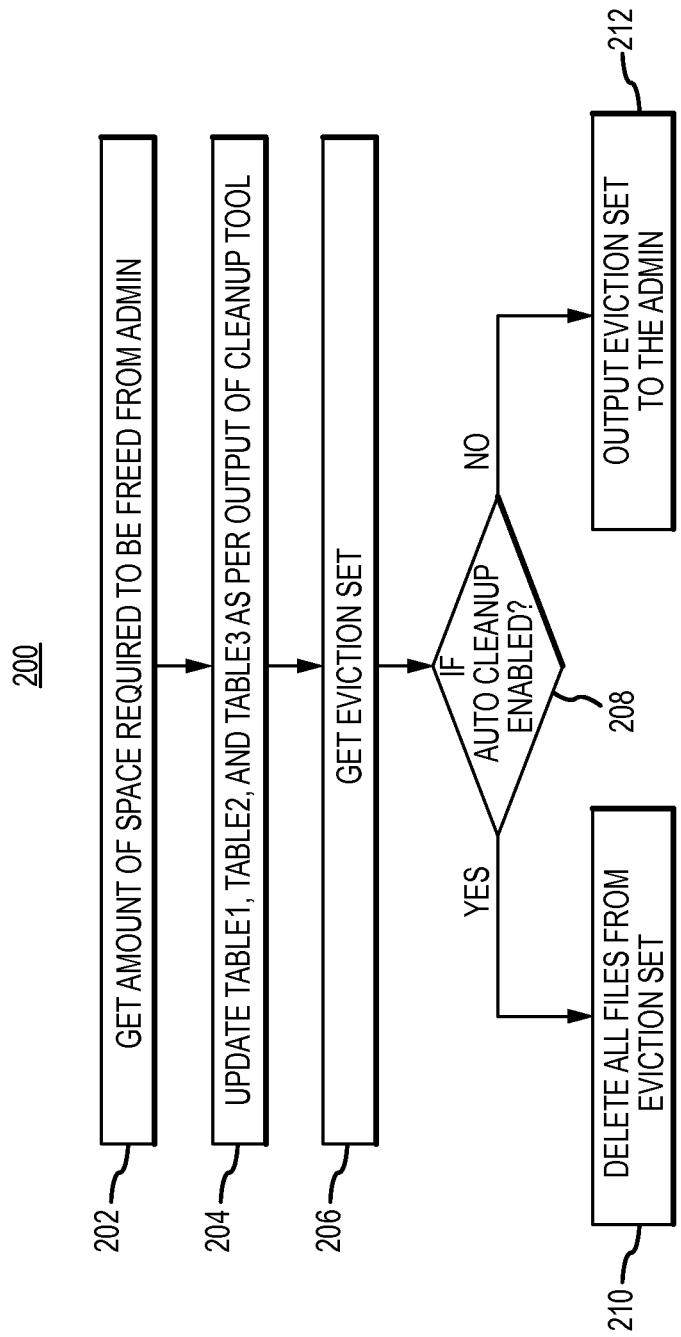
FIG. 2 is a flow diagram of a method of identifying an eviction set of files, according to an embodiment.

FIG. 2 is a flow diagram of a method 200 of identifying an eviction set of files, according to an embodiment. An amount of space required to be freed is predetermined at 202. In an embodiment, the space required to be freed is selected and set by an administrator. Alternatively, the space required to be freed is pre-selected as part of a software routine or other automated process. Next, information tables are updated at 204. The information tables include a file clean up information table (Table 1 via method 300), an interdeduplicated block information table (Table 2 via method 400), and an interdeduplicated file information table (Table 3 via method 600). As referred to herein, the "file cleanup information table" is a table or other mechanism for storing data entries for each file output by method 200. As referred to herein, the "interdeduplicated block information table" refers to a table or other mechanism for storing data related to the locations of deduplication block chunk and the specific files associated with the deduplication block chunks. As referred to herein, the "interdeduplicated file information table" refers to a table or other mechanism for storing data related to deduplication peers of a file. After the information tables are updated, an eviction set of files is obtained at 206. Next, a determination is made as to whether automatic cleanup is enabled at 208. If automatic cleanup is not enabled at 208, then the eviction set of files is evicted at 210 from one storage pool to another storage pool. If automatic cleanup is enabled at 208, then the eviction set of files is outputted at 212. In an embodiment, the set of files is outputted to the administrator.

Figure 3:
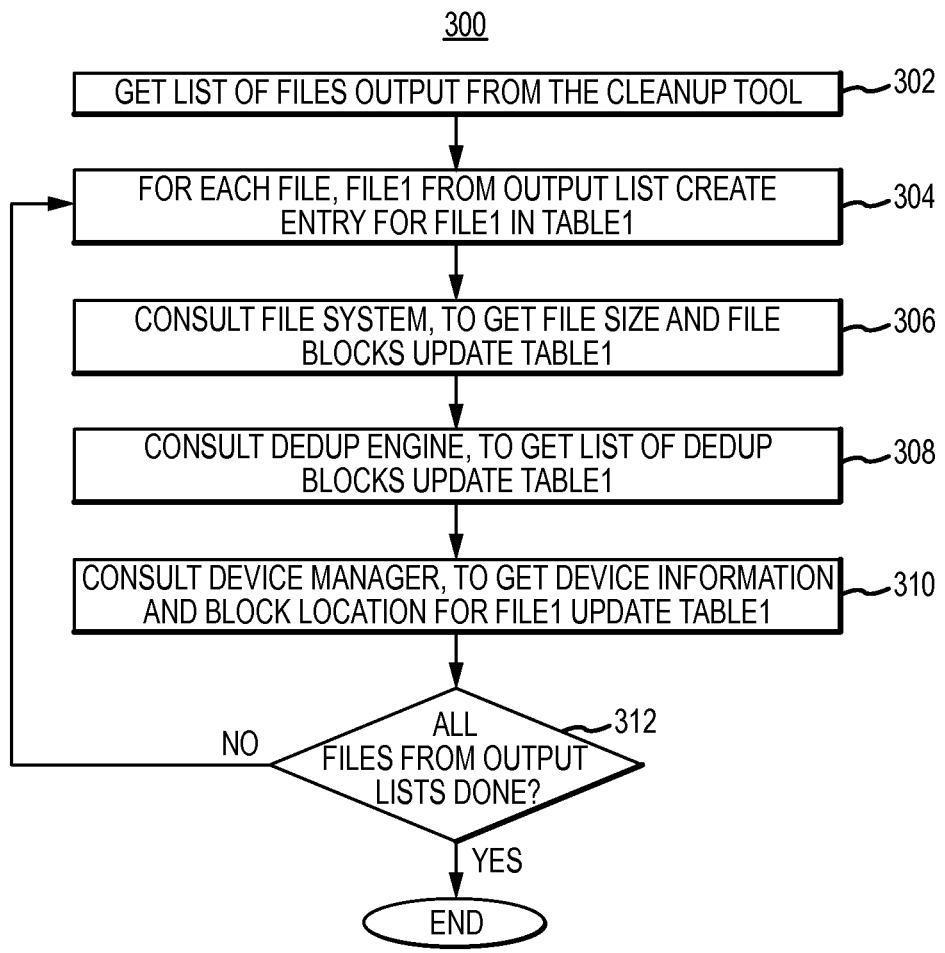
FIG. 3 is flow diagram of a method of building a file cleanup information table for the method of identifying an eviction set of files illustrated in FIG. 2, according to an embodiment.

Turning now to FIG. 3, a flow diagram is provided of a method 300 of building the file cleanup information table ("Table 1") referred to at 204, according to an embodiment. First, a list of files to be cleaned up ("SETFILE 1") is obtained at 302. Next, Table 1 is created and an entry is inserted into Table 1 for each file in the list of files to be cleaned up ("SETFILE 1") at 304. File size and file block data are obtained and the collected data is inserted into Table 1 for each SETFILE 1 at 306. The file size and file block data are obtained from the file system, in an embodiment. Next, a list of deduplicated blocks is obtained and inserted into Table 1 at 308. The deduplicated block data is obtained from a deduplication engine, in an embodiment. Device information and block location are obtained for each SETFILE 1 and inserted into Table 1 at 310. Such information is obtained from a device manager, in an embodiment. Next, a determination is made whether all files from the list of files to be cleaned have been examined at 312. If not, the method iterates at 304. If so, the method ends.

Sample Table 1 below is a portion of a file cleanup information table, according to an embodiment.

TABLE 1

| File Name | Size kB | Device Name | File Location | Dedup Block Count | Dedup Block Numbers |
|---|---|---|---|---|---|
| File 1 | 200 | Device 1 | Outer tracks | 10 | 11-20 |
| File 2 | 300 | Device 2 | Inner tracks | 10 | 31-40 |
| File 3 | 400 | Device 1 | Middle tracks | 5 | 11-15 |
| File 4 | 100 | Device 1 | Outer Track | 5 | 16-20 |
| File 5 | 150 | Device 1 | Outer Track | 5 | 25-29 |
| File 6 | 150 | Device 2 | Outer Track | 10 | 31-40 |
| File 7 | 150 | Device 2 | Outer Track | 0 | — |

As depicted, each file, here, Files 1-7, include entries in Table 1. Files 1-7 make up a cleanup subset of the total set of files in storage. Each entry includes the file size and the name of the device on which the file is included. For example, Files 1, 3, 4, and 5 are located on Device 1, while Files 2, 6, and 7 are located on Device 2. Additionally, locations of the files on the devices are listed in an adjacent column. In an embodiment, Files 1, 4, and 5 are located on an outer track of Device 1, File 3 is located on a middle track of Device 1, File 2 is located on an inner track of Device 2, and File 7 is located on an outer track of Device 2. In another column of Table 1, the number of deduplicated blocks of the files which are shared by other files are also included. For instance, File 1 shares 10 blocks (i.e., blocks 11-20 on Device 1) with another file, File 2 shares 10 blocks (i.e., blocks 31-40 on Device 2) with another file, File 3 shares 5 blocks (i.e., blocks 11-15 on Device 1) with another file (as can be seen, File 1), File 4 shares 5 blocks (i.e., blocks 16-20 on Device 1) with another file, File 5 shares 5 blocks (i.e., blocks 25-29 on Device 1) with another file, File 6 shares 10 blocks (i.e., blocks 31-40 on Device 2) with another file (as can be seen in Table 2, File 2), and File 7 has no blocks shared with any other file.

Figure 4:
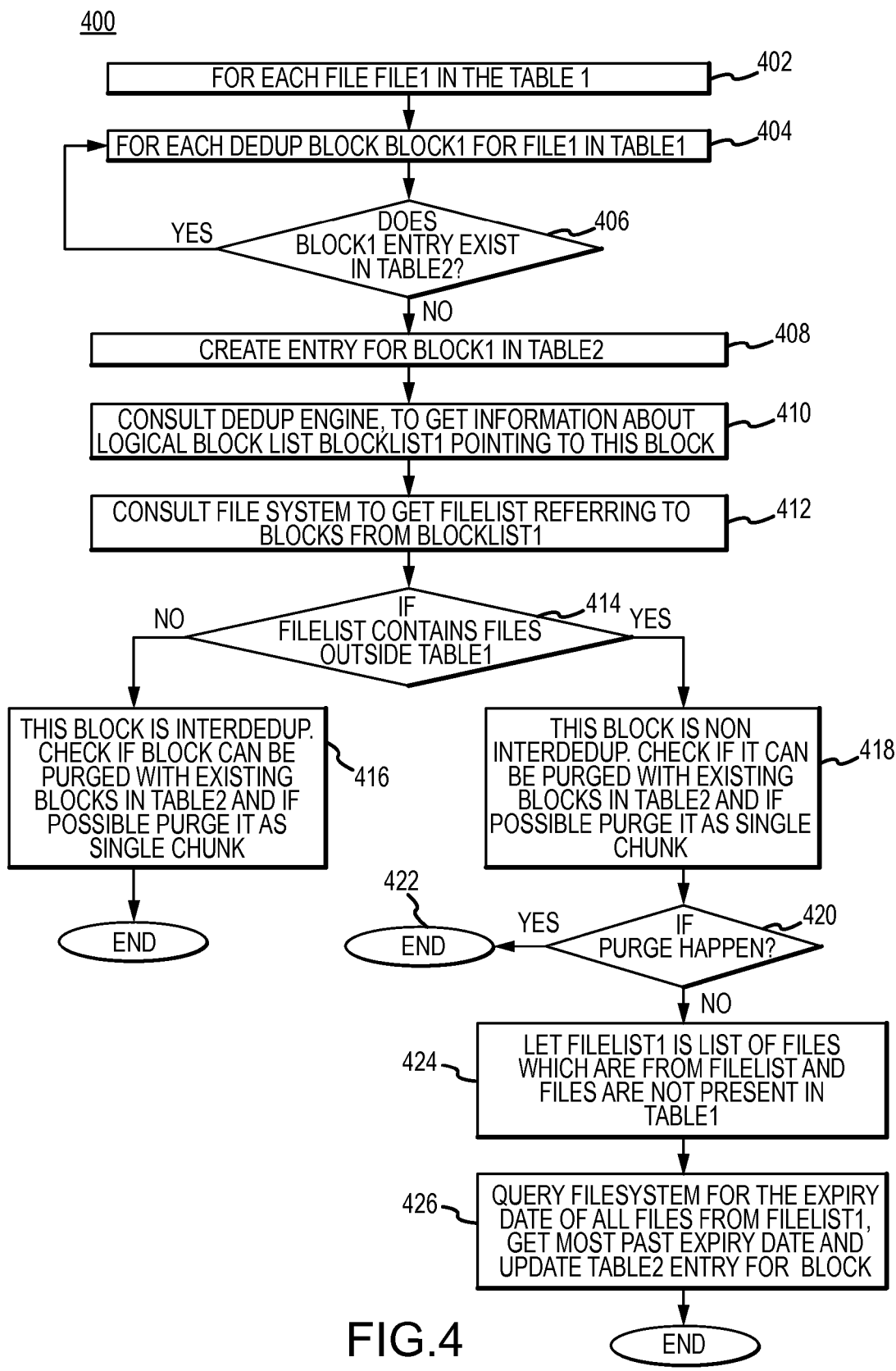
FIG. 4 is a flow diagram of a method of creating an inter-deduplicated block information table for the method of identifying an eviction set of files illustrated in FIG. 2, according to an embodiment.

FIG. 4 is a flow diagram of a method 400 of creating an interdeduplicated block information table ("Table 2") as referenced at 204 of method 200, according to an embodiment. To build Table 2, each file SETFILE1 listed in Table 1 is examined at 402 and deduplicated blocks ("BLOCK1") of SETFILE1 are identified at 404. For each deduplicated block, a determination is made as to whether an entry for the deduplicated block BLOCK1 is included in Table 2 at 406. If so, the method 400 iterates at 402. If not, an entry is created and included in Table 2 at 408. Next, a list of logical blocks ("BLOCKLIST1") pointing to the deduplicated blocks is obtained at 410. For example, the BLOCKLIST1 is retrieved from the deduplication engine. Then, a list of the files ("FILELIST") pointing to the deduplicated blocks from BLOCKLIST1 is obtained at 412, for example, by consulting the file system. A determination is then made as to whether the list of files FILELIST includes files that are not listed in Table 1 at 414. If not, then the block is identified as an interdeduplicated block and an examination is made according to method 500 below as to whether the block can be purged with other blocks listed in Table 2 at 416. If so, the block is purged preferably as a single chunk along with other blocks identified as interdeduplicated at 418. As used herein, the term "interdeduplicated" is defined as a block that is shared by more than one file that is included in the list of files to be cleaned up (i.e., Table 1). If the list of files includes those that are not listed in Table 1, then the block is identified as being non-interdeduplicated, an examination is made according to method 500 below as to whether the block can be purged with other blocks in Table 2 at 420. If so, the block is purged preferably as a single chunk along with other blocks identified by method 500 at 422. If not, then another list of the files ("FILELIST1") not included in FILELIST but that point to the non-interdeduplicated blocks is created at 424 and a query is presented as to the expiry date of each file in the FILELIST1 to identify the most expired file at 426.

Sample Table 2 below is a portion of an interdeduplication block information table, according to an embodiment.

TABLE 2

| Device | Start Block # | End Block# | File List | Outside Dedup | Outside Expiry |
|---|---|---|---|---|---|
| Device 1 | 11 | 15 | File 1 File 3 | No | — |
| Device 1 | 16 | 20 | File 3 File 4 | No | No |
| Device 1 | 25 | 29 | File 5 | Yes | Sep. 01, 2012 |
| Device 2 | 31 | 40 | File 2 File 6 | No | No |

Devices are listed in the far left column of Table 2. Each entry includes the start block and an end block of each data chunk. For example, Device 1 has various chunks of data made up of blocks. In an embodiment, Device 1 has a chunk of data beginning at block 11 and ending at block 15, which is referenced by File 1 and File 3, is not referred to by outside deduplicated files and hence, has no outside deduplicated file having an expiration date. Chunk of data from blocks 16 to 20 is referenced by Files 1 and 4, is not referred to by outside deduplicated files, and has no outside deduplicated file having an expiration date. Chunk of data located at blocks 25 to 29 is referenced to by File 5, and has another file that is outside of the cleanup subset of files (Table 1). That outside file has an expiration date of Sep. 1, 2012. Device 2 has a chunk of data on blocks 31 to 40 that is referenced to by Files 2 and 6, is not referred to by outside deduplicated files, and has no outside deduplicated file having an expiration date.

Figure 5:
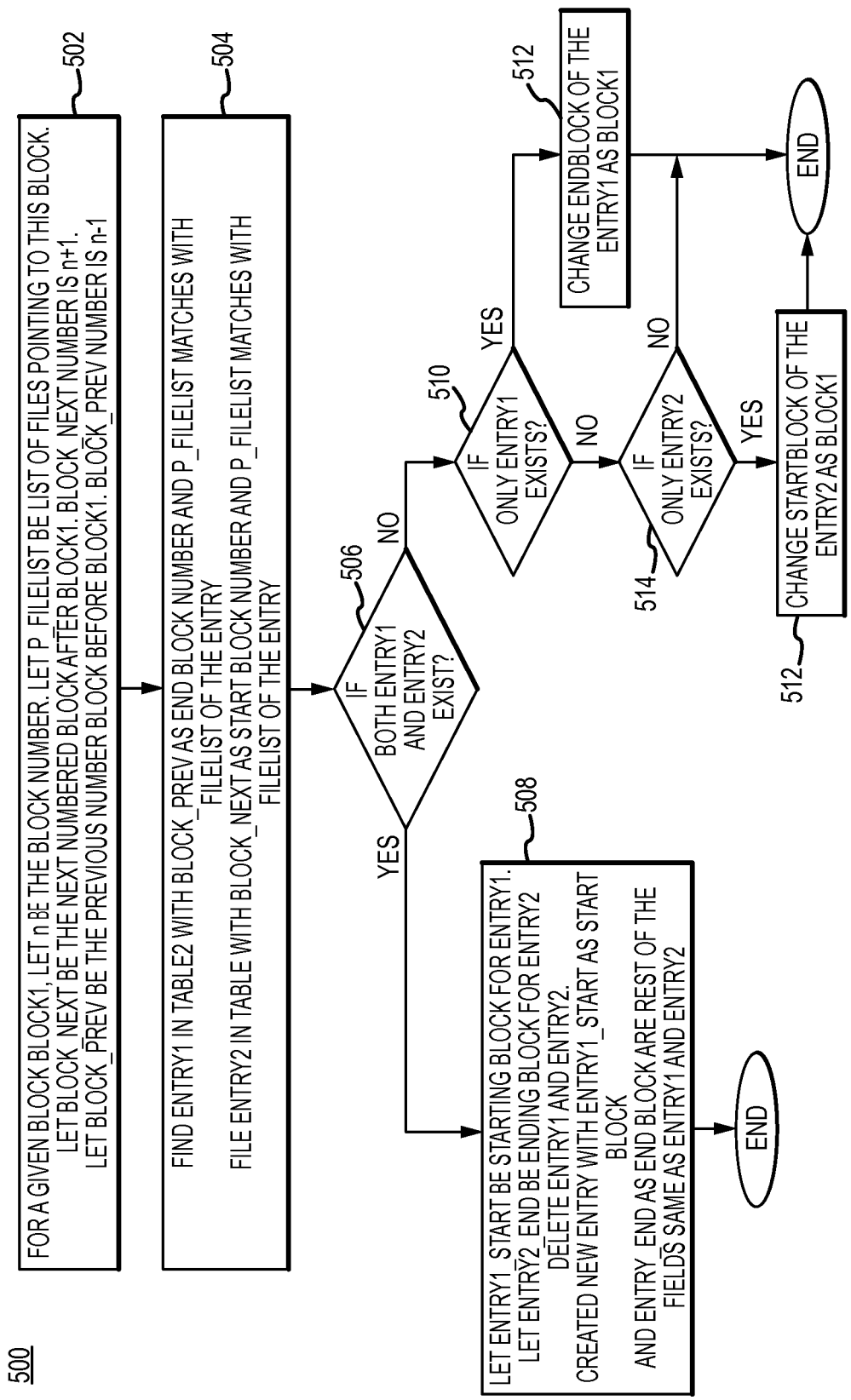
FIG. 5 is a flow diagram of a method of determining contiguity of a file for use in the method of creating an interdeduplicated block information table illustrated in FIG. 4, according to an embodiment.

FIG. 5 is a flow diagram of a method 500 of determining disk contiguity of a file for use at 414 and 416 of method 400, according to an embodiment. In particular, the method updates the start and end blocks of each file FILE1 in Table 1. At 502, for a given block ("BLOCK1"), n is set as the block number, P_FILELIST is a list of files pointing to BLOCK1, BLOCK_NEXT is the next, consecutively numbered block after BLOCK1 (i.e., n+1) and BLOCK_PREV is the previous, consecutively numbered block before BLOCK1 (i.e., n−1). A first entry ("Entry1") is located in Table 2, where BLOCK_PREV is identified as the end block number and P_FILELIST of BLOCK_PREV matches with what is listed in FILELIST at 504. Additionally, a second entry ("Entry2") is located in Table2 with BLOCK_NEXT identified as the start block number and where P_FILELIST of BLOCK_NEXT matches with what is listed in FILELIST of the entry at 504. At 506, a determination is made as to whether both Entry1 and Entry2 exist at 504. If both exist, then the starting block for Entry1_START is changed to Entry1, and the ending block for Entry2_END is changed to Entry2, while Entry1 and Entry2 are deleted at 508. A new entry is created in Table2 with Entry1_START as a start block and Entry_END as an end block and the remaining fields the same at 506.

Returning to 506, if one or both of Entry1 and Entry2 do not exist, then a determination is made as to whether only Entry1 exists at 510. If so, EndBlock of Entry1 is changed to BLOCK1 at 512. If not, a determination is made as to whether only Entry2 exists at 514. If not, no changes are made. If so, StartBlock of Entry2 is changed to BLOCK1 at 516.

Figure 6:
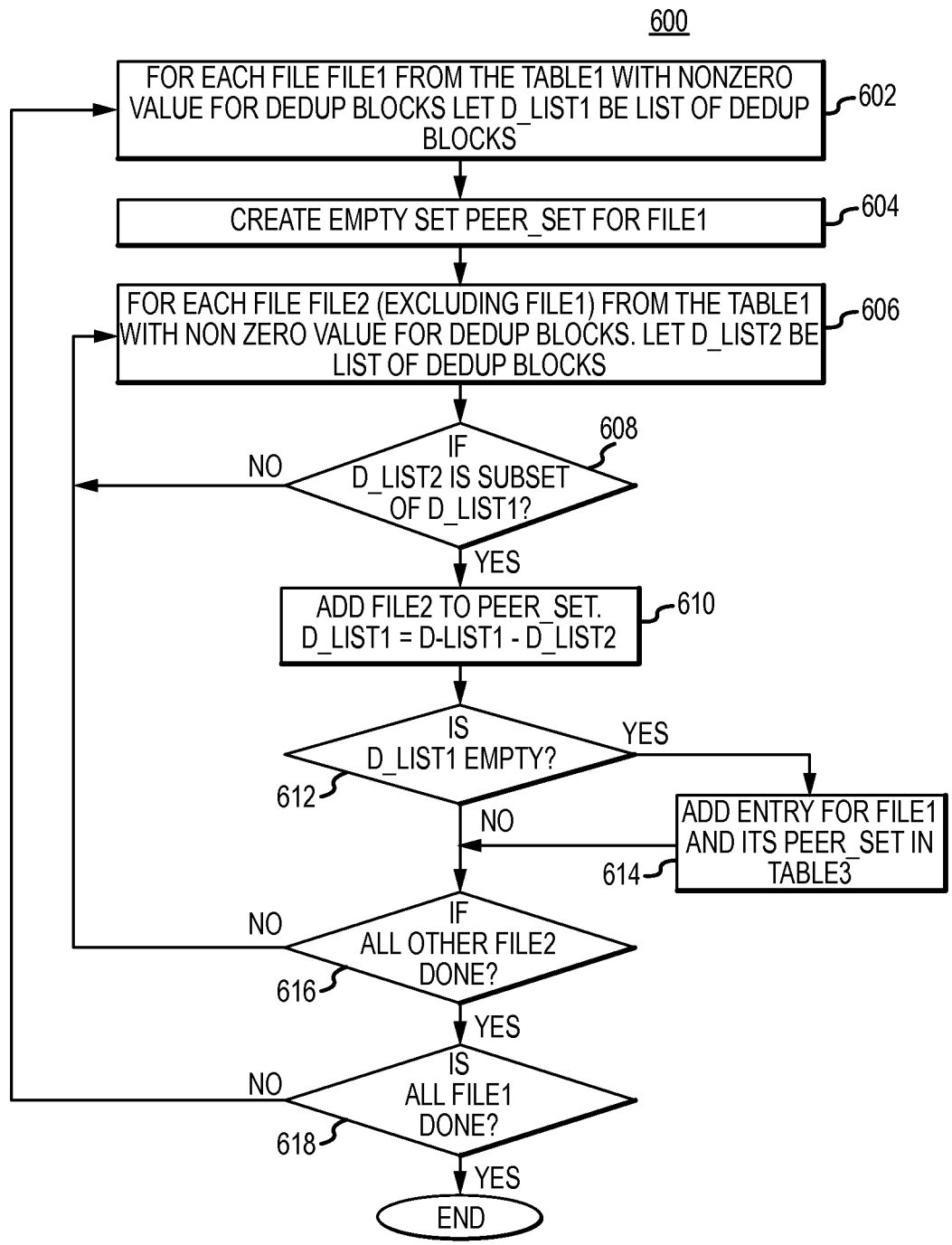
FIG. 6 is a flow diagram of a method of obtaining interdeduplicated file sets for the method of identifying an eviction set of files illustrated in FIG. 2, according to an embodiment.

FIG. 6 is a flow diagram of a method 600 of obtaining interdeduplicated file sets for building Table 3, according to an embodiment. For each file SETFILE1 from Table 1 with a non-zero value for deduplicated blocks, a D_LIST1 is created listing the deduplicated blocks from SETFILE1 at 602. Next, an empty set (PEER_SET) is created for SETFILE1 at 604. For all files that are not included as part of SETFILE1 from Table1 (i.e., FILE2) that have non zero values for deduplicated blocks, a listing (i.e., D_LIST2) is created to include those files at 606. Next, a determination is made as to whether D_LIST2 is a subset of D_LIST1 at 608. If not, method 600 iterates at 606. If so, FILE2 is added to PEER_SET and D_LIST1 is changed so that D_LIST1 does not include D_LIST2 at 610. Subsequently, a determination is made as to whether D_LIST1 is empty at 612. If so, FILE1 and its PEER_SET is added to Table3 at 614. If not, a determination is made as to whether all other files in FILE2 have been examined at 616. If not, method 600 iterates at 606. If so, another determination is made as to whether all other files in FILE2 have been examined at 616. If so, method 600 ends. If not, method 600 iterates at 602.

Sample Table 3 below is an exemplary table including interdeduplicated file information.

| File Name | PEER_SET |
| --- | --- |
| File 1 | File3, File4 |
| File 2 | File6 |

Sample Table 3 shows that File 1 is an interdeduplicated file because File 1 has a peer set including File 3 and File 4, meaning the blocks making up File 1 are also referred to by Files 3 and 4. Referring back to Table 1, blocks 11-20 of File 1 on Device 1 overlap with blocks 11-15 of File 3 and blocks 16-20 of File 4 on Device 1. Similarly, File 2 has a peer set including File 6, which means that the blocks of File 2 are referred to by File 6 (e.g., blocks 31-40 of File 2 and blocks 31-40 of File 6 both on Device 2 overlap with each other).

Figure 7:
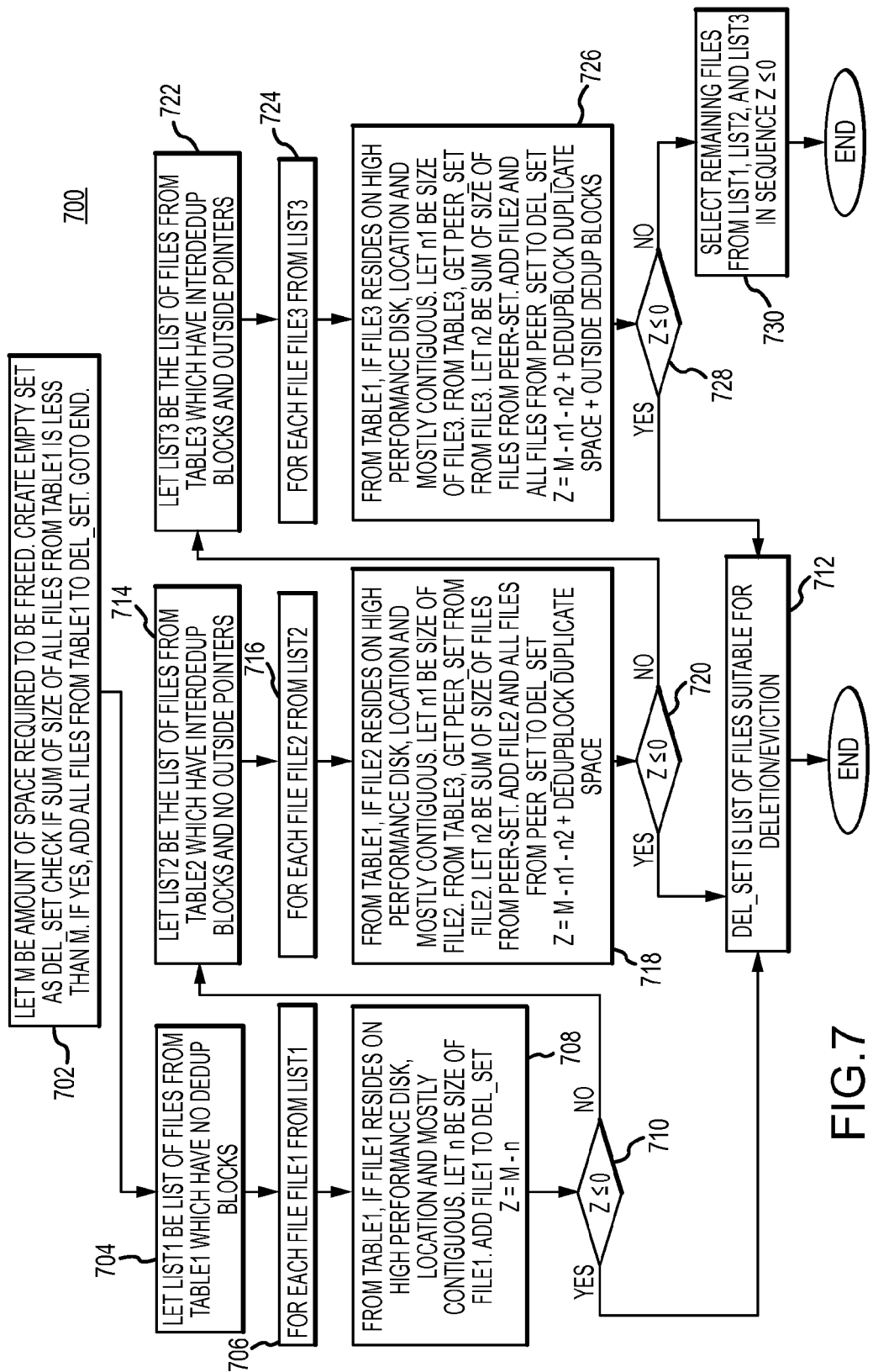
FIG. 7 is a flow diagram of a method of creating a set of files for eviction for use in the method of identifying an eviction set of files illustrated in FIG. 2, according to an embodiment.

As noted above in method 200, an eviction set of files is obtained at 206. To identify the eviction set of files, FIG. 7 illustrates a flow diagram of a method for creating a set of files for eviction, according to an embodiment. At 702, the predetermined amount of space required to be freed is obtained from step 202 and set to value "M", an empty set is created as DEL_SET (i.e., the eviction set of files), and the total size all of the files from Table 1 is compared with M. If the total size is less than M, then all of the files from Table 1 is set to DEL_SET and method 700 ends.

If the total size is more than M, then an examination is made of the list of files from Table 1 (LIST1) having no deduplicated blocks at 704. Each FILE1 from LIST1 is examined at 706. From Table 1, if FILE1 resides on a high performance disk, is at a relatively easy to retrieve location, and is mostly contiguous, then FILE1 is added to DEL_SET at 708. The file size of FILE1 is set at n and is subtracted from M (e.g., Z=M−n). A determination is made as to whether Z in DEL_SET is less than or equal to 0 at 710. If so, then DEL_SET is identified as the set of files for eviction at 712 and method 700 ends.

If not, then an examination is made of the list of files from Table 2 (LIST2) having interdeduplicated blocks and no files that are not listed on Table 1 (FILE2) referring thereto at 714. Each FILE2 from LIST2 is examined at 716. From Table 1, if FILE2 resides on a high performance disk, is at a relatively easy to retrieve location, and is mostly contiguous, then the PEER_SET of FILE2 is retrieved from Table 3 at 718 and FILE2 and the files of PEER_SET are included in DEL_SET. Next, a determination is made as to whether substracting the size of FILE2 (n1) and the total file size of the files in PEER_SET (n2) from the predetermined required amount of space (M) and adding the deduplicated block duplicate space (e.g., Z=M−n1−n2+deduplicated block duplicate space) is less than or equal to 0 at 720. If Z is equal to or less than zero, then DEL_SET is identified as the set of files for eviction at 712 and method 700 ends.

If Z is not equal to or less than zero, then method 700 iterates at 722 where an examination is made of the list of files from Table 3 (LIST3) having interdeduplicated blocks and files that are not listed on Table 1 (FILE2) referring thereto. Each FILE3 from LIST3 is examined at 724. From Table 1, if FILE3 resides on a high performance disk, is at a relatively easy to retrieve location, and is mostly contiguous, then the PEER_SET of FILE3 is retrieved from Table 3 at 726 and FILE3 and the files of PEER_SET are included in DEL_SET. Next, a determination is made as to whether substracting the size of FILE3 (n1) and the total file size of the files in PEER_SET (n2) from the predetermined required amount of space (M) and adding the deduplicated block duplicate space and the outside deduplicated block space (e.g., Z=M−n1−n2+deduplicated block duplicate space+the outside deduplicated block space) is less than or equal to 0 at 728. If so, then DEL_SET is identified as the set of files for eviction at 712 and method 700 ends. If Z is not equal to or less than zero, then method 700 iterates at 730 and the remaining files from LIST1, LIST2 and LIST3 are selected in sequence until Z is less than or equal to zero.

By identifying a set of candidate files for eviction by considering the physical image of the files to be cleaned, selection of such candidate files suitable for meeting a free space requirement is optimized. The methods described above can be implemented as an application or tool ("cleanup tool") that interacts with existing deduplication logic to obtain data related to the files to be cleaned. The existing deduplication logic can export an application program interface that provide such data to the cleanup tool. The cleanup tool can also interact with a device manager to obtain information related to the actual storage devices where the files to be cleaned are stored, including physical block location, track location, and/or disk location.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

What is claimed is:

1. A system for optimizing selection of files for eviction to free up a predetermined amount of space comprising:
    a first storage pool including a first storage device;
    a second storage pool including a second storage device; and
    a processor in operable communication with the first and second storage pools:
        analyzing an effective space occupied by each file of a plurality of files in the first storage pool;
        identifying, from the plurality of files, one or more data blocks of each file to free up the predetermined amount of space based on the analysis of the effective space of each file of the plurality of files;
        selecting one or more of the plurality of files as one or more candidate files for eviction, based on the identified one or more data blocks;
        evicting the one or more candidate files for eviction from the first storage pool to the second storage pool;
        after the plurality of files have undergone a deduplication process, determining whether the one or more data blocks is pointed to by an other file other than an instant file of the plurality of files being examined; and
        choosing the instant file, if the one or more data blocks is not pointed to by the other file and if the instant file occupies space equal to or greater than the predetermined amount of space, as the one or more candidate files for eviction.

2. The system of claim 1, wherein the processor is further:
    determining disk contiguity of each file of the plurality of files; and designating most-contiguous files from the plurality of files occupying space equal to or greater than the predetermined amount of space as the one or more candidate files for eviction.

3. The system of claim 1, wherein the processor is further:
classifying the one or more candidate files for eviction according to location; and
designating the one or more candidate files for eviction based on location of the files.

4. The system of claim 3, wherein the processor is further classifying the one or more candidate files for eviction according to disk location.

5. The system of claim 3, wherein the processor is further classifying the one or more candidate files for eviction according to track location.

6. A system for optimizing selection of files for eviction to free up a predetermined amount of space comprising:
a first storage pool including a first storage device;
a second storage pool including a second storage device; and
a processor in operable communication with the first and second storage pools:
analyzing an effective space occupied by each file of a plurality of files in the first storage pool,
identifying, from the plurality of files, one or more data blocks of each file to free up the predetermined amount of space based on the analysis of the effective space of each file of the plurality of files,
selecting one or more of the plurality of files as one or more candidate files for eviction, based on the identified one or more data blocks,
evicting the one or more candidate files for eviction from the first storage pool to the second storage pool,
analyzing a clean-up subset of files included in the plurality of files,
after the plurality of files have undergone a deduplication process, determining whether the one or more data blocks is pointed to by an other file other than an instant file of the plurality of files being examined,
examining whether the other file other than the instant file is included as part of the clean-up subset of files, and
choosing the instant file as the one or more candidate files for eviction, if the other file is included as part of the clean-up subset of files and the instant file occupies space equal to or greater than the predetermined amount of space.

7. The system of claim 6, wherein the processor is further:
if the other file is outside of the clean-up subset of files,
determining whether the other file has an expiration date within a predetermined expiration date range; and
choosing the instant file, if the other file has the expiration date within the predetermined expiration date range and occupies space equal to or greater than the predetermined amount of space as the one or more candidate files for eviction.

8. A system for optimizing selection of files for eviction to free up a predetermined amount of space comprising:
a first storage pool including a first storage device;
a second storage pool including a second storage device; and
a processor in operable communication with the first and second storage pools:
analyzing an effective space occupied by each file of a plurality of files in the first storage pool,
identifying, from the plurality of files, one or more data blocks of each file to free up the predetermined amount of space based on the analysis of the effective space of each file of the plurality of files,
selecting one or more of the plurality of files as one or more candidate files for eviction, based on the identified one or more data blocks,
evicting the one or more candidate files for eviction from the first storage pool to the second storage pool,
after the plurality of files have undergone a deduplication process, determining whether the one or more data blocks is pointed to by an other file other than an instant file of the plurality of files being examined, and if not, whether the instant file occupies space equal to or greater than the predetermined amount of space,
classifying the instant file according to location,
determining disk contiguity of the instant file, and
designating the instant file as the one or more candidate files for eviction based on file location and disk contiguity.

9. The system of claim 8, wherein the processor, as part of selecting is further performing, after the step of determining whether one or more data blocks is pointed to and before the step of determining disk contiguity:
analyzing a clean-up subset of files included in the plurality of files;
examining whether the other file other than the instant file is included as part of the clean-up subset of files; and
choosing the instant file as the one or more candidate files for eviction, if the other file is included as part of the clean-up subset of files.

10. A non-transitory physical computer storage medium comprising a computer program product for implementing a method of optimizing selection of files for eviction from a first storage pool to free up a predetermined amount of space in the first storage pool, the method comprising:
analyzing an effective space occupied by each file of a plurality of files in the first storage pool;
identifying, from the plurality of files, one or more data blocks making up each file to free up the predetermined amount of space based on the analysis of the effective space of each file of the plurality of files;
selecting one or more of the plurality of files as one or more candidate files for eviction, based on the identified one or more data blocks;
evicting the one or more candidate files for eviction from the first storage pool to a second storage pool;
after the plurality of files have undergone a deduplication process, determining whether the one or more data blocks is pointed to by an other file other than an instant file of the plurality of files being examined; and
choosing the instant file, if the one or more data blocks is not pointed to by the other file and if the instant file occupies space equal to or greater than the predetermined amount of space, as the one or more candidate files for eviction.

11. The non-transitory physical computer storage medium of claim 10, wherein identifying includes:
classifying the one or more candidate files for eviction according to location; and
designating the one or more candidate files for eviction based on location of the files.

12. The non-transitory physical computer storage medium of claim 10, wherein identifying includes:
analyzing a clean-up subset of files included in the plurality of files;
after the plurality of files have undergone a deduplication process, determining whether the one or more data blocks is pointed to by an other file other than an instant file of the plurality of files being examined;
examining whether the other file other than the instant file is included as part of the clean-up subset of files; and
choosing the instant file as the one or more candidate files for eviction, if the other file is included as part of the clean-up subset of files and the instant file occupies space equal to or greater than the predetermined amount of space.

13. The non-transitory physical computer storage medium of claim 12, wherein identifying includes:
if the other file is outside of the clean-up subset of files, determining whether the other file has an expiration date within a predetermined expiration date range; and
choosing the instant file, if the other file has the expiration date within the predetermined expiration date range and occupies space equal to or greater than the predetermined amount of space, as the one or more candidate files for eviction.

* * * * *